3,077,506
Patented Feb. 12, 1963

3,077,506
THERMOELECTRICITY
Dale E. Hill and Arnold S. Epstein, Dayton, Ohio, assignors to Monsanto Chemical Company, St. Louis, Mo., a corporation of Delaware
Filed Oct. 27, 1960, Ser. No. 60,543
21 Claims. (Cl. 136—5)

The present invention relates to devices for the direct conversion of heat to electricity as well as processes for heating and cooling.

It is an object of this invention to provide thermoelectric materials for obtaining electricity from heat sources, particularly, above 1000° C. It has been found that prior art materials which have thermoelectric generating properties cannot be employed at such elevated temperatures because of decomposition and consequent loss of useful thermoelectric properties. The materials of the present invention possess qualities of thermal stability hitherto unknown in prior art devices, along with thermoelectric generating properties.

More particularly, this invention contemplates the use of new crystalline rhombohedral boron phosphides having a boron-to-phosphorus ratio of at least 6 to 1 as the thermally stable thermoelectric generating material in devices used for such purposes. The preferred compositions of matter within the range $B_6P$ to $B_{20}P$ and most preferred is the stoichiometric compound hexaboron phosphide having the formula $B_6P$.

The new crystalline rhombohedral boron phosphides of the present invention are extremely hard, thermally stable and chemically inert.

The novel forms of crystalline boron phosphide disclosed herein may be prepared by a chemical reaction between elemental boron and elemental phosphorus, by thermal decomposition of boron phosphide having the formula BP, by the reaction of elemental boron with BP, by reaction of elemental boron with the compound phosphine, $PH_3$, or by the reaction of a phosphorus source, such as ferrophosphorus or crude phosphate ore, with a boron source, such as elemental boron, crude borax, or other boron compound, in a molten inorganic matrix, such as molten metals or salts thereof.

While the above-described methods may be used to prepare any of the crystalline boron phosphides having a boron-to-phosphorus ratio of at least 6 to 1, they are particularly useful for preparing the stoichiometric compound $B_6P$. However, a more preferred method for preparing higher boron phosphides, i.e., those having boron-to-phosphorus ratios greater than 6 to 1, consists of heating the compound $B_6P$ under specific conditions set forth hereinafter. This method is preferred because it is susceptible to more accurate means of control for obtaining specific compositions within the above ratio than are the earlier named methods for obtaining the same compositions.

The following specific examples illustrate methods of preparation of the new crystalline boron phosphides under equilibrium conditions:

Example 1

The transformation of the simple form of boron phosphide, BP, to the crystalline form having the formula $B_6P$, was conducted by placing 100 g. of boron phosphide in finely-divided form into a graphite crucible in a porcelain tube located in an electric furnace. The porcelain tube was connected to a vacuum system which could be maintained at 50 microns pressure. The furnace was brought up to a temperature of 1200° C. and maintained constant. It was found that the evolution of phosphorus during a 12 hour period yielded a residual product having the formula of $B_6F$.

Another experiment utilizing this method gave a product analyzing $B_{6.5}P$. The starting material, BP, was found to be useable whether amorphous or cubic crystalline in form to yield the same ultimate products.

Example 2

The reaction of elemental boron with elemental phosphorus for the production of $B_6P$ was carried out by charging 0.4176 g. of amorphous boron into a graphite crucible which had been prepared by drilling a 5/16" hole in a cylindrical piece of 1/2" graphite rod. The charged crucible was placed in a 3/4" O.D. ceramic tube 10" long, closed at the end nearest the sample. One-half of this ceramic tube was located in a high temperature furnace, while the other end was placed in an adjacent low temperature furnace, without any cold zone between the two furnaces. The other end of the ceramic tube was then charged with 1.976 g. of amorphous red phosphorus, after which the tube was evacuated and sealed.

The tube was located in the two adjacent furnaces which were then gradually brought up to the desired temperature. The hot end was maintained at a temperature of 1100° C., while the temperature of the phosphorus end was maintained at 111° C. to volatilize the phosphorus and to maintain a phosphorus partial pressure of about 1000 microns.

The heating of the reaction system caused the phosphorus to vaporize with the result that the phosphorus vapor filled the entire tube at the desired pressure. The phosphorus vapor then reacted with the hot boron contained at the other end of the tube. It was found that at the end of the heating period of about 24 hours, the boron had been transformed substantially completely to a compound with the formula, $B_6P$. A similar experiment conducted at 1200° C. was also found to give a substantially quantitative yield of $B_6P$. In general, the preferred operating pressure which yields the desired $B_6P$ instead of boron phosphide, BP, is in the range of 100 to 1,000,000 microns at temperatures ranging between 1000° C. and 1947° C. Thus, at 1000° C. a pressure of 100 microns gives hexaboron phosphide, $B_6P$, while a pressure of 1570 microns gives boron phosphide.

In the present example the use of a shaped charge of starting material, that is, the boron located in the drilled cavity of the graphite crucible resulted in the production of a similar and identically shaped product of hexaboron phosphide. This shaped article was found to be stable at high temperatures, i.e., to a temperature of about 1200° C.

The hexaboron phosphide product was found to have a bulk density of 2.45. However, the ultimate density of individual homogeneous particles varies between 2.60 and 2.72. In contrast, cubic boron phosphide, BP, has a theoretical X-ray density of 2.97.

In this example, the condition of the formation of hexaboron phosphide is that the system be operated such that the partial pressure of phosphorus is less than that of the decomposition pressure of boron phosphide at the ambient temperature.

The higher boron phosphides are prepared in accordance with this example by adding to 67.65 g. of elemental boron 9.6 g. of elemental phosphorus to obtain $B_{20}P$, 4.84 g. of phosphorus to obtain $B_{40}P$, 2.76 g. of phosphorus to obtain $B_{70}P$ and 1.94 g. of phosphorus to obtain $B_{100}P$. By the same procedure still higher boron phosphides are prepared.

Example 3

The formation of hexaboron phosphide by the reaction of boron trichloride as the boron source with elemental phosphorus as the phosphorus source in hydrogen was carried out by introducing the respective zones into a reactor from the respective gas phases. The elemental phosphorus was provided by bubbling a stream of hydrogen through a heated pool of phosphorus, yellow form. The hydrogen gas, heated with phosphorus, was directed into a heated reaction vessel, into which gaseous boron trichloride was also flowing. At temperatures of 1100° C. the reaction between boron trichloride and the phosphorus results in the formation of the crystalline product hexaboron phosphide. However, it is essential that the conditions be such that the partial pressure of phosphorus be less than that of the decomposition pressure of boron phosphide at the ambient temperature.

This same procedure is followed to obtain the higher boron phosphides by increasing proportionately the amount of $BCl_3$ required to supply free boron sufficient to react with the elemental phosphorus to obtain the desired boron-to-phosphorus ratio.

*Example 4*

The production of hexaboron phosphide by the reaction of elemental boron as the boron source in solid form with phosphine, $PH_3$, as the phosphorus source supplied in gas form was conducted in a ceramic tube located in an electric furnace. A 10 g. sample of elemental boron held in the furnace for a period of 12 hours with the continuous passage of phosphine over the boron was found to result in a substantially complete transformation to hexaboron phosphide. The necessary condition for the reaction was that the partial pressure of phosphorus be less than that of the decomposition pressure of boron phosphide at the ambient temperature. In like manner the higher boron phosphides are prepared by increasing the amount of available boron or decreasing the proportion of phosphine.

This method was also found to yield the desired boron phosphide by the reaction of the said elemental solid form of boron with elemental phosphorus carried in an inert gas stream, preferably hydrogen, although argon or nitrogen can also be used.

The preferred procedure for obtaining higher boron phosphides is based upon the fact that when hexaboron phosphide is heated within a temperature range of from 800° C. to 2100° C. and within a pressure range of from 1 micron to 100 atmospheres it undergoes a progressive weight loss due to evolution of phosphorus until the desired crystalline boron phosphide is obtained as determined by a continuous measurement of the hexaboron phosphide sample. For each boron phosphide there is a definite weight loss value. When the sample has lost a specific weight, the B/P ratio for that weight loss represents the composition of the resultant boron phosphide.

There are several methods available for continuously measuring the weight loss of the sample, the more common ones being by use of a quartz spring balance in conjunction with a cathetometer, a simple spring balance or a strain gauge. These devices are commercially available.

By following the above procedure any one of the boron phosphides having a boron-phosphorus ratio greater than 6 to 1 is obtained. The reaction rate is controlled by manipulating the temperature and pressure as desired.

As a variation of this procedure one may substitute for the $B_6P$ sample, any other higher boron phosphide and thermally treat it to obtain a still higher boron phosphide.

Figure 1:
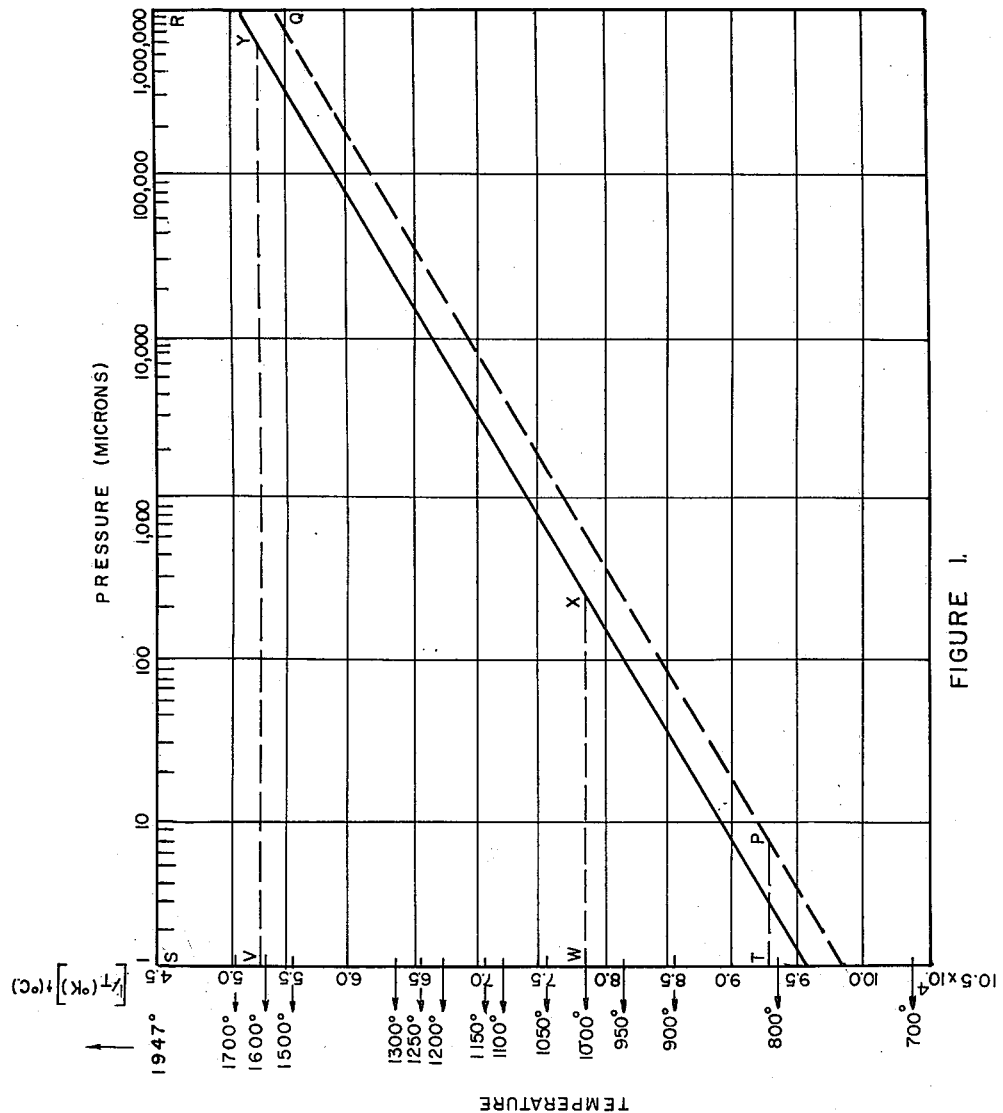
FIG. 1 is a graph showing the relationship between process operating conditions for the production of the crystalline boron phosphides of this invention, exemplified by $B_6P$, and the prior art material BP.

It will be appreciated from the foregoing examples and with reference to FIG. 1 that any specific boron phosphide having a boron-to-phosphorus ratio of greater than 6 to 1 may be prepared according to the described methods.

FIG. 1 shows the relationship between the compound BP and $B_6P$, which is representative of the boron phosphides having a boron-to-phosphorus ratio of at least 6 to 1. This graph represents the equilibrium conditions for the formation of $B_6P$. Equilibrium graphs for the higher boron phosphides are similar within the temperature range of 800° C. to 2100° C. and pressures ranging from 1 micron to 100 atmospheres. It should be noted, however, that boron phosphides higher than $B_6P$ are also obtained within the $B_6P$ region described in FIG. 1, under non-equilibrium conditions, so long as the partial pressure of phosphorus is less than the decomposition pressure of the compound BP at the ambient temperature. FIG. 1 shows a plot of the straight lines XY and PQ, expressing the relationship between the partial pressure of phosphorus in the reaction zone relative to temperature (° C.). The pressure is plotted on a logarithmic scale, while the temperature is plotted as a reciprocal of degrees Kelvin $1/T$ (° K.) $\times 10^4$ as a uniform scale and also as a direct reading of degrees centigrade (non-uniform scale). $B_6P$ is formed within the region below the line PQ, while BP is formed under conditions above that line.

In general, as shown in FIG. 1, the preferred operating region for the production of $B_6P$ is within the region designated VWXY.

When $B_6P$, prepared according to any of the foregoing examples, is heated within the temperature range of 800° C. to 2100° C. at pressures within the range of 1 micron to 100 atmospheres, it begins to evolve phosphorus. When the phosphorus evolution reaches a given weight percent loss as determined by a cathetometer, the product composition of the higher boron phosphide can be read directly from a curve.

The materials of the instant invention have dissociation pressures of less than 100 microns at temperatures in excess of 1200° C. This is indicative of a high order of stability at elevated temperatures. For this reason, the materials of this invention are suitable for use in devices having high temperature applications, e.g., in thermogenerators.

Figure 2:
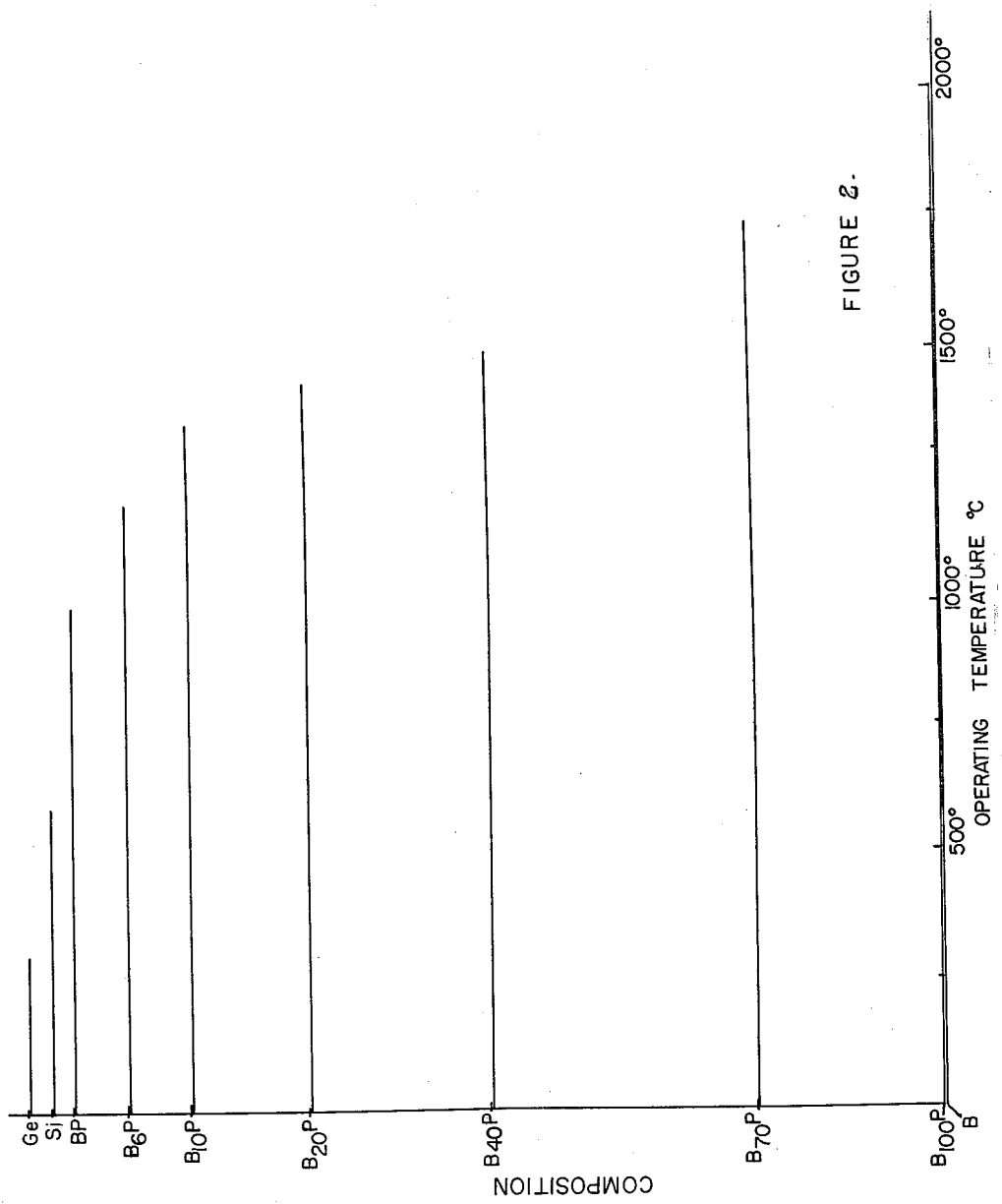
FIG. 2 is a graph showing the relationship between various prior art thermoelectric materials and the crystalline boron phosphides of the instant invention against their approximate operating temperatures.

FIG. 2 shows the comparative optimum operating temperatures of various thermoelectric materials. It is seen that the materials of this invention are thermally stable up to 2000° C. whereas the compound BP is thermally stable at only 1000° C. As an illustration of the comparative thermal stability of the compounds BP and $B_6P$ (representative of the new boron phosphides), when BP is heated at 1100° C. under 100 microns pressure it immediately begins to decompose until after about 40 hours the BP is completely transformed into $B_6P$. At 1200° C. and 100 microns pressure, BP decomposes still more rapidly until after about only 3 hours it is transformed completely to $B_6P$. $B_6P$, on the other hand, is thermally stable at 1200° C. and 100 microns pressure. It will be seen that the higher boron phosphides of the instant invention are clearly superior to germanium, silicon and the compound BP from the standpoint of thermal stability. At temperatures above 1000° C., BP evolves phosphorus copiously resulting in a deleterious atmosphere of phosphorus on and around the thermogenerator components which is corrosively destructive of the operation thereof. Coincidental with this evolution of phosphorus is a physical breakdown of the BP component due to a collapse of its cubic crystalline structure. On the other hand, the higher boron phosphides described herein are not cubic crystalline in form, hence, even when phosphorus is lost (at temperatures much higher than 1000° C.), there is no physical breakdown of thermogenerator devices using this material as a component. Since there is much less phosphorus relative to boron in the instant boron phosphides, than in BP, there is less phosphorus to evolve into a deleterious atmosphere of phosphorus around the thermogenerator device components. As a consequence, the boron phosphides described and claimed herein are far superior to germanium, silicon or BP, being operable at higher temperatures for longer periods of time with less danger of corrosion and physical breakdown.

Figure 3:
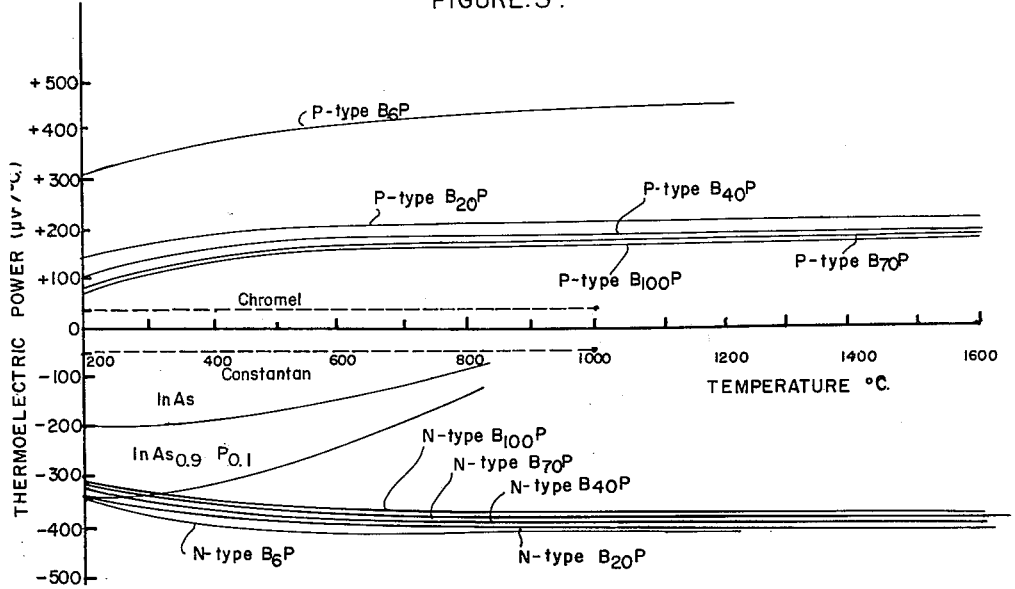
FIG. 3 shows the property of thermoelectric power in relation to temperature for a number of thermoelectric materials.

In FIG. 3, the property of thermoelectric power is shown in relation to temperature for a number of thermoelectric materials. The upper portion of the drawing includes various P-type boron phosphides. P-type compositions can be obtained by the presence or inclusion of P-type impurities such as zinc, mercury, cadmium, beryllium or magnesium. For comparison, a conventional P-type material, Chromel alloy, is also shown. The lower portion of FIG. 3 represents the N-type materials. Boron phosphide compositions may be modified to obtain N-type characteristics by doping with an additive such as sulfur, selenium or tellurium. It is seen that a greater thermoelectric power is obtained with $B_6P$, particularly at high temperatures, than with the comparison materials indium arsenide, InAs, or the mixed binary indium arsenide phosphide, $InAs_{0.9}P_{0.1}$. Such mixed compounds are of utility in the present invention for thermoelectric generation, cooling and heating.

Figure 4:
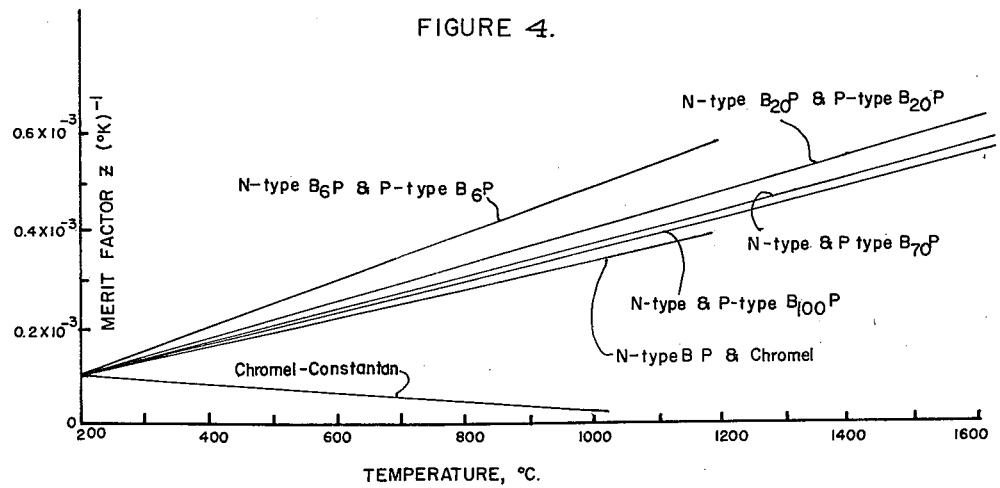
FIG. 4 shows the merit factor, Z, for a number of thermocouple combinations at various temperatures.

In FIG. 4, the merit factor, Z, as discussed below, is shown for certain thermocouple combinations. The reference materials Chromel-Constantan are shown to have considerably inferior merit factors than the couple of Chromel-N-type $B_6P$, and the couples of N-type $B_6P$, $B_{20}P$, $B_{70}P$ or $B_{100}P$ with P-type $B_6P$, $B_{20}P$, $B_{70}P$ or $B_{100}P$.

In addition to the boron phosphides described above, the use of various modified or doped compositions is contemplated by the present invention, whether these modifiers are chemically combined or physically dispersed, e.g., in the space lattice of the base material. When one adds a small amount, e.g., 5% carbon (graphite, coal or elemental forms) to the $B_6P$, for example, one finds that the merit factor, Z, of the material is improved. The preferred group of elements for modifying or doping are carbon, arsenic, antimony, nitrogen (as nitrides), silicon, germanium, aluminum, gallium, sulfur, tellurium, selenium, zinc, cadmium, mercury, nickel, beryllium, magnesium, iron, palladium, platinum, tungsten, molybdenum and tantalum.

The said elements are used as such and in compound forms, both stoichiometric and non-stoichiometric, for use as dopants or modifying agents. The proportion of the doping additive added to the above boron phosphides is broadly in the range of less than 15% by weight, or preferably from 0.005% to 15% by weight. A still more preferred range is from 0.01% to 10% by weight relative to the weight of the boron phosphide base material.

The mechanism by which modification of the thermoelectric properties is obtained by doping has not been completely elucidated. However, the minute additions ($10^{14}$ to $10^{17}$ carriers per cc. of the matrix composition, that is from 0.000001% to 0.001% by weight) of additives or dopants characteristic of typical semiconductor compositions, e.g., in transistors, rectifiers and diodes, are not effective in the present thermoelectric compositions.

The relative magnitude of additive concentration in the present thermoelectric materials and the increased merit factor obtained by doping is shown in the following values of merit factor which are obtained with $B_6P$ as the base material.

| Composition: | Merit factor Z |
|---|---|
| $B_6P$ | Less than $1 \times 10^{-5}$. |
| $B_6P$ with 0.0001% S | Less than $1 \times 10^{-5}$. |
| $B_6P$ with 1% S | Greater than $1 \times 10^{-5}$. |

In addition to the improvement of boron phosphides by doping, it is also possible to improve the merit factor by the formation of binary compositions. As an instance of such a modified composition, the merit factor for the composition $B_6P_xAs_{1-x}$ is improved relative to $B_6P$. The best improvement occurs when the arsenic-phosphorus ratio is greater than one; for example, $B_6P_{0.1}As_{0.9}$ has a merit factor of at least 20% better than $B_6P$.

The thermoelectric bodies of the compositions described herein are employed in the present invention as shaped blocks, rods, films or wires, etc., produced by suitable means. Preferred embodiments of the invention include uniform stoichiometric compounds and the non-stoichiometric materials having the dopants dispersed therein (for example, in the space lattice of the boron phosphide matrix). In addition, gradient-concentration bodies may be used, in which the modifying components are present in a uniform or non-uniform gradation of concentration from one end of the body to the other. For example, a modified boron phosphide body having one face constituted of boron phosphide, BP, with an intermediate region of $B_6P$ and the other face of the compound $B_{20}P$ is made by hot pressing the respective components, or is made as a uniformly graded product by melting, diffusion or chemical formation from the elements. Furthermore, mixed binary compositions such as the $B_6P_xAs_{1-x}$ described can also be made by these processes.

In using the herein described compositions for thermoelectric processes, the electrical relationships and the data presented hereinbelow show the advantages of the new boron phosphides. The so-called "figure of merit," Z, is defined as the ratio of the Seebeck coefficient for thermoelectric power, S, squared to the product of the electrical resistivity, $\rho$, and thermal conductivity K:

$$Z = \frac{S^2}{\rho K}$$

(Semiconductor Thermoelements and Thermoelectric Cooling, page 1, A. F. Ioffe Infosearch Limited, London (1957).) The figure of merit, Z, can be seen to play an important role in thermoelectric devices used for heating, cooling, and power generation. In thermoelectric power generation, the theoretical maximum efficiency obtainable is related to Z in the following way:

$$\eta = \frac{T_1 - T_0}{T_1} \times \frac{\sqrt{1 + \frac{1}{2}Z(T_1 + T_0)} - 1}{\sqrt{1 + \frac{1}{2}Z(T_1 + T_0)} + \frac{T_0}{T_1}}$$

where $\eta$ = maximum efficiency
$T_1$ = temp. at hot junction
$T_0$ = temp. at cold junction
Z is as defined supra (ibid. part 1, chapter 2, page 40).

The following examples illustrate specific embodiments of the present invention:

*Example 5*

An example of the use of hexaboron phosphide, $B_6P$, as an element of the thermocouple is shown in the following example.

Hexaboron phosphide as a block having N-type conductivity is electrically joined to metallic Chromel wire as the P-type component. When this electrical junction is heated to a temperature of 1200° C., with the reference junctions at room temperature, an electromotive force of 0.45 volt is obtained. This corresponds, with these particular materials, to a merit factor of $$0.4 \times 10^{-3} \text{ °K.}^{-1} \text{ at } 1200° \text{ C.}$$

In general, the components of the couple are joined by fusing or soldering suitable leads to the external load.

The electrical leads should be of good electrical conductivity.

Example 6

The use of N- and P-type $B_6P$ for a thermoelectric couple is shown in the following example.

A $B_6P$ block having N-type conductivity (by the addition of 1% sulfur) is electrically joined at one end to a P-type $B_6P$ block (by the addition of 1% cadmium). When this junction is heated to a temperature of 1200° C., and the reference junctions at the remote ends of the two blocks are maintained at room temperature, an electromotive force of 0.8 volt is obtained. This corresponds with these particular materials to a merit factor of $0.55 \times 10^{-3}$ °$K^{-1}$ at 1200° C.

Example 7

The use of N- and P-type $B_{10}P$ for a thermoelectric couple is shown in the following example.

A $B_{10}P$ block having N-type conductivity (by the addition of 1% sulfur) is electrically joined at one end to a P-type $B_{10}P$ block (by the addition of 1% cadmium). When this junction is heated to a temperature of 1200° C. and the reference junctions at the remote ends of the two blocks are maintained at room temperature, an electromotive force of 0.82 volt is obtained. This corresponds with these particular materials to a merit factor of $0.50 \times 10^{-3}$ °$K^{-1}$ at 1200° C.

Example 8

A boron phosphide block having the formula $B_{20}P$ having N-type conductivity (by adding 1% sulfur) is electrically joined at one end to a P-type $B_{20}P$ (1% cadmium) block. When this junction is heated to a temperature of 1600° C. and the reference junctions at the remote ends of the two blocks are maintained at room temperature, an electromotive force of 0.86 volt is obtained. This corresponds to a merit factor of $0.64 \times 10^{-3}$ °$K^{-1}$ at 1600° C.

Example 9

A boron phosphide block having the formula $B_{40}P$ having N-type conductivity (by adding 1% sulfur) is electrically joined at one end to a P-type $B_{40}P$ (1% cadmium) block. When this junction is heated to a temperature of 1600° C. and the reference junctions at the remote ends of the two blocks are maintained at room temperature, an electromotive force of 0.81 volt is obtained. This corresponds to a merit factor of $0.60 \times 10^{-3}$ °$K^{-1}$ at 1600° C.

Example 10

A boron phosphide block having the formula $B_{70}P$ having N-type conductivity (by adding 1% sulfur) is electrically joined at one end to a P-type $B_{70}P$ (1% cadmium) block. When this junction is heated to a temperature of 1600° C. and the reference junctions at the remote ends of the two blocks are maintained at room temperature, an electromotive force of 0.76 volt is obtained. This corresponds to a merit factor of $0.56 \times 10^{-3}$ °$K^{-1}$ at 1600° C.

Example 11

A boron phosphide block having the formula $B_{100}P$ having N-type conductivity (by adding 1% sulfur) is electrically joined at one end to a P-type $B_{100}P$ (1% cadmium) block. When this junction is heated to a temperature of 1600° C. and the reference junctions at the remote ends of the two blocks are maintained at room temperature, an electromotive force of 0.74 volt is obtained. This corresponds to a merit factor of $0.53 \times 10^{-3}$ °$K^{-1}$ at 1600° C.

In order to compare the thermoelectric properties of $B_6P$ to other compositions, the following table shows the values for the thermoelectric power and also the merit factors and optimum operating temperature representative of thermocouples based upon the following pairs:

| Thermocouple Material | Thermoelectric Power (Microvolts/°C.) | (Z $10^{-3}$ °$K^{-1}$) | Optimum Operating Temp. |
|---|---|---|---|
| N- and P-type $B_6P$ | 800 | 0.55 | 1,200° C. |
| N-type $B_6P$ and Chrome L | 450 | 0.4 | 1,200° C. |
| P-type $B_6P$ and Constantan | 450 | 0.4 | greater than 1200° C. |
| P-type $B_6P$ and tungsten | 450 | greater than 0.2 | Do. |

It is a particular advantage of the instant boron phosphides that these materials maintain the desired thermoelectric properties at unusually high temperatures, i.e., up to 2000° C. Prior art thermoelectric materials have been found to lose their useful thermoelectric properties very radically in this high temperature range.

The preparation of doped compositions, such as $B_6P$, modified by sulfur is readily conducted by conventional methods. For example, when sulfur is used as the dopant, with $B_6P$, the sulfur is dispersed in the space lattice of the $B_6P$ by mixing the sulfur with the elemental boron and phosphorus before reacting these components to produce $B_6P$. Other methods include diffusion from vapor, liquid or solid additions into the base of hexaboron phosphide. Another method is hot pressing, suitable, for example, in adding carbon to $B_6P$.

This application is a continuation-in-part of applicants' copending application S.N. 855,592 filed November 27, 1959.

What is claimed is:

1. A thermoelectric couple suitable for use as an electric generating device which generates electricity at temperatures up to 2000° C. consisting of a combination comprising a boron phosphide having a boron-to-phosphorus ratio of at least 6 to 1 together with a complementary electrical element and associated circuitry.

2. A thermoelectric couple suitable for use as an electric generating device which generates electricity at temperatures up to 2000° C. consisting of boron phosphide having a boron-to-phosphorus ratio of at least 6 to 1 as a matrix containing at least one member selected from the group consisting of carbon, arsenic, antimony, nitrogen (as nitrides), silicon, germanium, aluminum, gallium, sulfur, tellurium, selenium, zinc, cadmium, mercury, beryllium, magnesium, nickel, iron, palladium, platinum, tungsten, molybdenum and tantalum, together with a complementary electrical element and associated circuitry.

3. A thermoelectric couple suitable for use as an electrical generating device which generates electricity at temperatures up to 2000° C. consisting of a combination comprising a boron phosphide having the formula $B_6P$, together with a complementary electrical element and associated circuitry.

4. A thermoelectric couple suitable for use as an electrical generating device which generates electricity at temperatures up to 2000° C. consisting of a boron phosphide having the formula $B_6P$ as a matrix containing from 0.005% to 15% by weight of at least one member selected from the group consisting of carbon, arsenic, antimony, nitrogen (as nitrides), silicon, germanium, aluminum, gallium, sulfur, tellurium, selenium, zinc, cadmium, mercury, beryllium, magnesium, nickel, iron, palladium platinum tungsten, molybdenum and tantalum, together with a complementary electrical element and associated circuitry.

5. A thermoelectric couple suitable for use as an electrical generating device which generates electricity at temperatures up to 2000° C. consisting of a combination comprising a boron phosphide having the formula $B_{20}P$, together with a complementary electrical element and associated circuitry.

6. A thermoelectric couple suitable for use as an electrical generating device which generates electricity at temperatures up to 2000° C. consisting of a boron phosphide having the formula $B_{20}P$ as a matrix containing from 0.005% to 15% by weight of one member selected from the group consisting of carbon, arsenic, antimony, nitrogen (as nitrides), silicon, germanium, aluminum, gallium, sulfur, tellurium, selenium, zinc, cadmium, mercury, beryllium, magnesium, nickel, iron, palladium, platinum, tungsten, molybdenum, and tantalum, together with a complementary electrical element and associated circuitry.

7. A thermoelectric couple suitable for use as an electrical generating device which generates electricity at temperatures up to 2000° C. consisting of a combination comprising a boron phosphide having the formula $B_{40}P$, together with a complementary electrical element and associated circuitry.

8. A thermoelectric couple suitable for use as an electrical generating device which generates electricity at temperatures up to 2000° C. consisting of a boron phosphide having the formula $B_{40}P$ as a matrix containing from 0.005% to 15% by weight of at least one member selected from the group consisting of carbon, arsenic, antimony, nitrogen (as nitrides), silicon, germanium, aluminum, gallium, sulfur, tellurium, selenium, zinc, cadmium, mercury, beryllium, magnesium, nickel, iron, palladium, platinum, tungsten, molybdenum and tantalum, together with a complementary electrical element and associated circuitry.

9. A thermoelectric couple suitable for use as an electrical generating device which generates electricity at temperatures up to 2000° C. consisting of a combination comprising a boron phosphide having the formula $B_{70}P$, together with a complementary electrical element and associated circuitry.

10. A thermoelectric couple suitable for use as an electrical generating device which generates electricity at temperatures up to 2000° C. consisting of a boron phosphide having the formula $B_{70}P$ as a matrix containing from 0.005% to 15% by weight of at least one member selected from the group consisting of carbon, arsenic, antimony, nitrogen (as nitrides), silicon, germanium, aluminum, gallium, sulfur, tellurium, selenium, zinc, cadmium, mercury, beryllium, magnesium, nickel, iron, palladium, platinum, tungsten, molybdenum and tantalum, together with a complementary electrical element and associated circuitry.

11. A thermoelectric couple suitable for use as an electrical generating device which generates electricity at temperatures up to 2000° C. consisting of a combination comprising a boron phosphide having the formula $B_{100}P$, together with a complementary electrical element and associated circuitry.

12. A thermoelectric couple suitable for use as an electrical generating device which generates electricity at temperatures up to 2000° C. consisting of a boron phosphide having the formula $B_{100}P$ as a matrix containing from 0.005% to 15% by weight of at least one member selected from the group consisting of carbon, arsenic, antimony, nitrogen (as nitrides), silicon, germanium, aluminum, gallium, sulfur, tellurium, selenium, zinc, cadmium, mercury, beryllium, magnesium, nickel, iron, palladium, platinum, tungsten, molybdenum and tantalum, together with a complementary electrical element and associated circuitry.

13. A thermoelectric couple suitable for use as an electric generating device which generates electricity at temperatures up to 2000° C. which consists of a P-type hexaboron phosphide $B_6P$, in electrical contact with an N-type hexaboron phosphide, $B_6P$, and electrical leads attached to said P-type and N-type hexaboron phosphides.

14. A thermoelectric generating material consisting of boron phosphide having a boron-to-phosphorus ratio of at least 6 to 1 containing dispersed therein as a modifying element, carbon which is present in the range of 0.005% to 15% by weight.

15. A thermoelectric generating material consisting of a boron phosphide having the formula, $B_6P$, containing dispersed therein as a modifying element, carbon, which is present in the range of 0.005% to 15% by weight.

16. A thermoelectric generating material consisting of a boron phosphide having the formula, $B_{20}P$, containing dispersed therein as a modifying element, carbon, which is present in the range of 0.005% to 15% by weight.

17. The process for the production of electricity which comprises applying heat at temperatures up to 2000° C. to one end of a thermoelectric couple while cooling the other end thereof, withdrawing a current from the said thermocouple, the said thermocouple having at least one electrical component comprising a boron phosphide having a boron-to-phosphorus ratio of at least 6 to 1.

18. The process for cooling a medium which comprises contacting the said medium with an end of a thermoelectric couple in which at last one electrical element comprises a boron phosphide having a boron-to-phosphorus ratio of at least 6 to 1, the said thermoelectric couple having electrical leads connected thereto, and passing a polarized electric current through the said couple whereupon the end of said thermocouple is cooled and the medium in contact therewith is cooled.

19. The process for heating a medium which comprises contacting the said medium with an end of a thermoelectric couple in which at least one electrical element comprises a boron phosphide having a boron-to-phosphorus ratio of at least 6 to 1, the said thermoelectric couple having electrical leads connected thereto, and passing a polarized electric current through the said couple whereupon the end of said thermocouple is heated and the medium in contact therewith is heated.

20. A thermoelectric element which generates electricity at temperatures from 800° C. to 1500° C. consisting of boron phosphide, $B_6P$, as a matrix containing at least one member selected from the group consisting of carbon, arsenic, antimony, nitrogen (as nitrides), silicon, germanium, aluminum, gallium, sulfur, tellurium, selenium, zinc, cadmium, mercury, beryllium, magnesium, nickel, iron, palladium, platinum, tungsten, molybdenum, and tantalum.

21. A thermoelectric element which generates electricity at temperatures from 800° C. to 1500° C. consisting of boron phosphide, $B_{20}P$, as a matrix containing at least one member selected from the group consisting of carbon, arsenic, antimony, nitrogen (as nitrides), silicon, germanium, aluminum, gallium, sulfur, tellurium, selenium, zinc, cadmium, mercury, beryllium, magnesium, nickel, iron, palladium, platinum, tungsten, molybdenum, and tantalum.

References Cited in the file of this patent

UNITED STATES PATENTS

| | | |
|---|---|---|
| 2,798,989 | Welker | July 9, 1957 |
| 2,858,275 | Folberth | Oct. 28, 1958 |
| 2,921,973 | Heikes et al. | Jan. 19, 1960 |
| 2,953,616 | Pessel et al. | Sept. 20, 1960 |

FOREIGN PATENTS

| | | |
|---|---|---|
| 748,847 | Great Britain | May 6, 1956 |

UNITED STATES PATENT OFFICE
CERTIFICATE OF CORRECTION

Patent No. 3,077,506                            February 12, 1963

Dale E. Hill et al.

It is hereby certified that error appears in the above numbered patent requiring correction and that the said Letters Patent should read as corrected below.

Column 1, line 72, for "$B_6F$" read -- $B_6P$ --; column 8, line 10, for "N-type $B_6P$ and Chrome 1" read -- N-type $B_6P$ and Chromel --; lines 65 and 66, for "palladium platinum tungsten," read -- palladium, platinum, tungsten, --; column 10, line 26, for "last" read -- least --.

Signed and sealed this 17th day of September 1963.

(SEAL)
Attest:

ERNEST W. SWIDER                                 DAVID L. LADD
Attesting Officer                                    Commissioner of Patents